Oct. 24, 1944.    M. P. GRAHAM ET AL    2,361,025
BALL JOINT
Filed Dec. 2, 1943
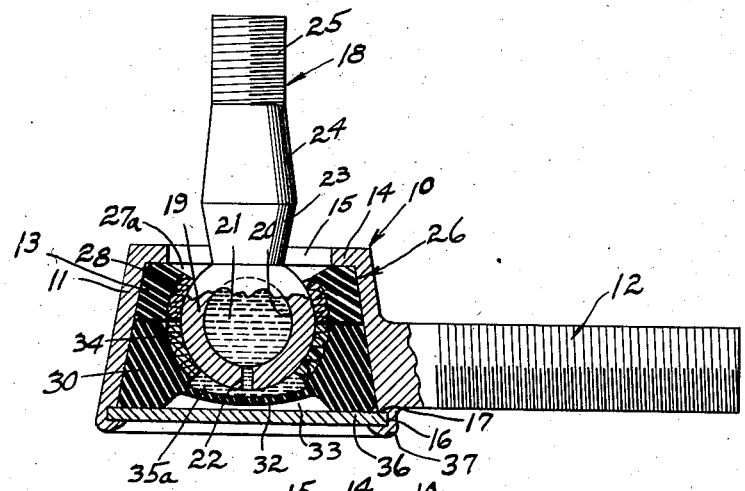
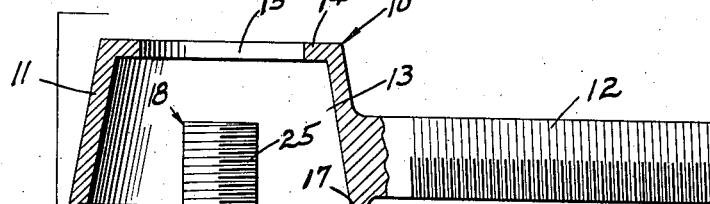
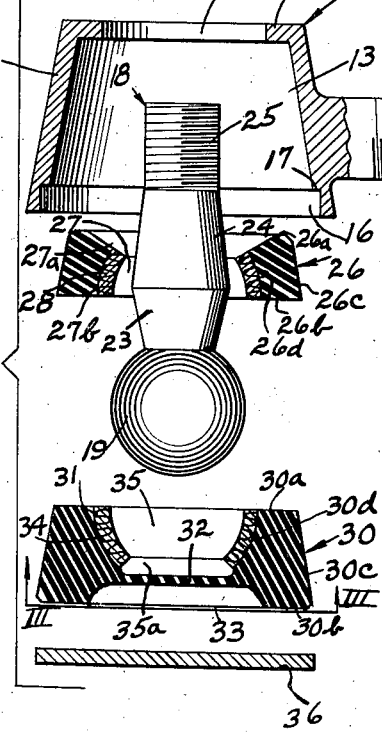
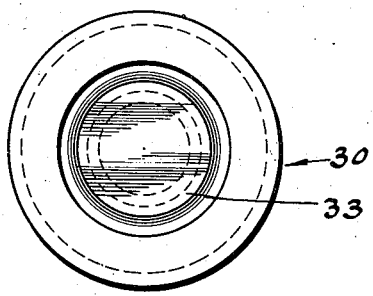
INVENTORS
MATTHEW P. GRAHAM
ANTHONY VENDITTY
By Charles Hills  Attys Patented Oct. 24, 1944

2,361,025

UNITED STATES PATENT OFFICE 2,361,025

BALL JOINT

Matthew P. Graham and Anthony Venditty, Detroit, Mich., assignors to Thompson Products, Incorporated, Cleveland, Ohio, a corporation of Ohio Application December 2, 1943, Serial No. 512,574

8 Claims. (Cl. 287—85)

This invention relates to joint constructions having resiliently bushed bearings.

Specifically the invention relates to rubber bushed ball and socket tie rod ends wherein radial loads on the rubber bushings do not tend to force the ball of the joint out of its socket.

The invention will hereinafter be specifically described as embodied in a ball and socket tie rod end, but it should be understood that the invention is generally applicable to joints.

In accordance with this invention, a tie rod end socket or housing receives a pair of rubber rings or bushings carrying segmental ball-shaped liners composed of flexible fabric material, deformable relatively hard rubber compositions such as "Baltic" or the like. One of the rings is open-ended while the other of the rings has a readily deformable relatively thin web portion forming a bottom for the recess therein. A ball stud has the ball end thereof seated in the ball socket provided by the liners in the bushings and has the shank thereof projecting through the open-ended ring. Heretofore, radial loadings of rubber bushings for ball joints had a translated axial load on the ball member tending to squeeze the ball member out of the socket. According to this invention, no such axial loads can be produced because the thin web member on the one ring is deformed under radial load and sufficient space is provided in the socket or housing to permit such deformation.

A feature of the invention includes the provision of a hollow ball-ended stud containing lubricant such as castor oil and having a bleed hole therein for supplying lubricant to the bearing surfaces of the joint. The web on the closed bottom ring will prevent leakage of the lubricant and will confine it to the bearing surfaces.

It is, then, an object of the invention to provide a rubber bushed joint assembly wherein radial loads on the rubber bushing do not produce axial loads on a joint member.

A still further object of the invention is to provide a resiliently bushed ball and socket joint wherein the bushings are so formed and so arranged in a housing that there is no tendency for squeezing the ball member out of the housing.

A still further object of the invention is to provide a simplified rubber bushed ball and socket joint wherein two rubber rings carry bearing material liners defining a ball socket for the joint.

A still further object of the invention is to provide a ball and socket tie rod end with an open ended resilient bushing providing a segmental socket seat for a portion of the ball member and with a second recessed resilient bushing providing a socket for the remainder of the ball end of the ball member and having a readily deformable end wall portion preventing leakage of lubricant from the bearing surfaces and capable of readily deforming when subjected to radial load.

Other and further objects of the invention will be apparent to those skilled in the art from the following detailed description of the annexed sheet of drawings which, by way of preferred example only, illustrates one embodiment of the invention.

On the drawing:

Figure 1 is a side elevational view, with parts in vertical cross section, of a ball and socket tie rod end according to this invention.

Figure 2 is a vertical cross-sectional exploded view, with parts in elevation, illustrating the tie rod end assembly of Figure 1 and the manner in which the parts are assembled.

Figure 3 is a bottom plan view of the rubber bushing having the deformable end wall as viewed along the line III—III of Figure 2.

As shown on the drawing:

In Figures 1 and 2 the reference numeral 10 designates generally a rubber bushed ball and socket tie rod end. The tie rod end 10 includes a socket or housing member 11 having a laterally extending externally threaded stem 12 for threaded insertion in the end of a tie rod (not shown). The housing 11 defines a conically tapered chamber 13 with an inturned flange 14 at the smaller end thereof defining a reduced circular opening 15. The large end of the chamber 13, as best shown in Figure 2, has a straight cylindrical counterbore 16 therein terminating in a flat shoulder 17.

A ball stud 18 has the ball end 19 thereof seated in the housing 10. The ball end 19 of the stud 18 is hollow to provide a lubricant chamber 20 adapted to be filled with lubricant such as castor oil 21. A small-diameter bore 22 is provided through the free or bottom end of the ball 19 to bleed lubricant 21 out of the chamber 20 for a purpose to be more fully hereinafter described.

The stud 18 has a neck portion 23 extending from the ball end 19 thereof and adapted to freely fit in the opening 15 of the housing. This neck portion 23 is tapered from the ball end to a reversely tapered steering-arm receiving portion 24. The small end of the reversely tapered portion 24 terminates in an externally threaded cylindrical portion 25 for receiving a nut thereon (not shown).

A rubber ring 26 having flat end faces 26a and 26b, a conical side wall 26c, and a segmental spherical inner wall 26d, is seated in the chamber 13 with the face 26a thereof abutting the flange 14 of the housing 11 and with the conical side wall 26c thereof snugly engaging the conical side wall of the housing. The ring 26 has an aperture 27 extending completely therethrough and provided with an outwardly flaring mouth 27a at the end wall 26a together with a major diameter portion 27b at the end face 26b thereof. A deformable liner 28 composed of flexible woven fabric, hard but deformable rubber compound, flexible plastic material having good bearing qualities, or the like is secured to the inner wall 26d of the ring 26 by a cementitious bond, by vulcanization or the like, and defines a semi-ball socket for the ball end 19 of the stud 18.

As shown in Figure 1, the neck portion 23 of the stud fits freely through the tapered mouth 27a of the ring 26 and the top half of the ball end 19 of the stud rides on the liner 28.

A second ring or bushing 30 having flat end faces 30a and 30b, a conical side wall 30c, and a segmental spherical inner wall 30d, is mounted in the housing 11 with the end wall 30a abutting the end wall 26b of the ring 26 and with the side wall 30c snugly engaging the tapered side wall of the housing.

The ring 30 has a segmental spherical recess 31 therein with the major diameter thereof at the end wall 30a. The recess 31 is bottomed by a flat thin web 32. The end face 30b of the ring 30 has a central recess 33 extending inwardly therefrom to the web 32 so that the web 32 is intermediate the end faces 30a and 30b of the ring.

The inner wall 30d of the ring 30 carries a flexible liner 34 preferably of the same material as the liner 28 and this liner 34 defines a semi-spherical socket 35 for the lower half of the ball end 19 of the stud 18. The major diameter of the socket 35 is at the end face 30a of the ring 30 and the liner 34 terminates in spaced relation from the web 32 to provide an annular chamber 35a beneath the socket 35.

As shown in Figure 1, the ring 26 surrounds the top half of the ball end 19 while the ring 30 surrounds the bottom half of this ball end. The web 32 is in spaced relation beneath the ball end 19.

The large open end of the housing chamber 13 is closed by means of a metal disk or plate 36 which is seated in the counterbore 16 against the shoulder 17. Metal from the housing 11 is spun or peened over the peripheral portion of the disk 36 as at 37 to secure the disk in position. The disk or plate 36 cooperates with the housing flange 14 to squeeze the rings 26 and 30 together and to deform the rubber-like material to assume a height or thickness less than the free height or thickness thereof. Thus, as shown in Figure 2, the ring 26 in its free state has the end face 26a thereof further above the top of the lining 28 than in Figure 1, where the end face 26a is flattened by being forced against the flange 14. Likewise the end face 30b of the ring 30 in its free state of Figure 2 is further below the web 32 than in its confined state of Figure 1.

The rings 26 and 30 are therefore axially foreshortened and loaded in the housing between the flange 14 and plate 36. The axial load on the rings expands them radially into tight fit on the side wall of the chamber 13 and the rings are thus also radially loaded.

Lubricant 21 from the chamber 20 bleeds through the hole 22 into the chamber 35a above the flexible web 32 and from the chamber 35a the lubricant can be distributed to the bearing surfaces of the liners 28 and 34 to lubricate the joint.

Since the rings 26 and 30 snugly engage the housing 11 and are under radial load, there would normally be a tendency for some of this radial load force to be translated into an axial load on the ball end of the stud. This would be especially true if the ring 30 had a solid bottom wall resting on the closure plate 36, since rubber from this wall would squeeze against the bottom end of the ball end 19 tending to force the ball toward the housing opening 15. However, in accordance with this invention, the thin web 32 of the ring 30 will be deformed whenever the ring is subjected to radial load and can readily bow down into the recess 33 provided above the plate 36 as shown in Figure 1. Therefore, radial loading of the bushing does not create any axial load on the stud. In addition, the flexible web 32 will seal lubricant in the socket chamber and will prevent ingress of dirt to the bearing surfaces.

From the above descriptions it will therefore be understood that this invention provides a ball and socket type tie rod end equipped with rubber bushings, one of which provides a semi-ball socket for the ball end portion of the stud adjacent the shank of the stud, the other of which provides a semi-ball socket for the free end or bottom end of the ball end and is equipped with a flexible deformable web or end wall to seal the socket chamber without subjecting the ball end to axial load.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A ball and socket tie rod end comprising a housing defining an open-ended frusto-conical chamber and having a laterally extending stem portion, said open-ended frusto-conical chamber having a shoulder at the small end thereof and a counterbore at the large end thereof, a ball stud having a shank projecting freely through the small end of the chamber and a ball end disposed in the chamber, a rubber ring snugly seated in said chamber having one end wall abutting the shoulder of the chamber, a deformable liner in said ring providing a semi-ball socket for the ball end of the stud, a second rubber bearing ring in said chamber having one end wall engaging an end wall of the first mentioned ring and having a deformable liner therein defining a semi-ball socket for the ball end of the stud, said second bearing ring having a thin flexible and deformable end wall portion intermediate the end faces thereof, a closure plate seated in said counterbore of the housing closing the large end of the housing, said plate being in spaced relation from said thin deformable wall of the second bearing ring, said liner in the second bearing ring terminating in spaced relation from said thin deformable wall to provide an annular chamber adjoining the semi-ball socket defined by the liner, said ball end of the stud being hollow to provide a lubricant chamber, and the free end of the stud having a bore connecting the chamber in the ball end of the stud with the annular chamber adjacent the ball socket.

2. A ball and socket type tie rod end comprising a housing defining an open-ended chamber with an inturned shoulder at one end and a counterbore in the other end, a ball stud having a shank projecting freely into said chamber at the shouldered end of the chamber and having a ball end disposed in the chamber, a pair of rubber bearing rings in said chamber receiving said ball end of the stud, one of said rings being open ended and abutting the shoulder of the housing, and the other of said rings having a thin deformable end wall spaced from the end faces of the ring, and a closure plate secured in said counterbore of the housing bottoming said other ring and spaced from the thin wall of the ring whereby said thin wall can deform under radial load.

3. A rubber bushed joint construction comprising a housing, a pair of rubber rings in said housing providing a ball socket therein, a ball stud having the ball end thereof seated in said socket, and one of said rubber rings having a deformable end wall intermediate the end faces of the ring for sealing said socket.

4. A joint construction comprising a housing, a stud in said housing, an open-ended rubber ring in said housing providing a semi-socket for said stud, a second rubber ring in said housing cooperating with the open-ended ring to complete the socket for said stud, and a thin deformable end wall integral with said second ring intermediate the end faces of the second ring.

5. In a ball and socket joint including a ball stud having a ball end and a shank projecting from said ball end, the improvement of an open-ended rubber ring disposed around said shank and defining a segmental socket for said ball end, and a second rubber ring having a deformable end wall intermediate the end faces thereof and defining a segmental ball socket for the portion of the ball end of the stud remote from said shank, said rubber rings cooperating to rotatably and tiltably support the stud and capable of being radially loaded without axially loading the stud.

6. A ball and socket joint comprising a ball stud, an open-ended rubber ring enveloping a portion of the ball end of said stud, and a recessed rubber ring enveloping the remaining portion of the ball end of said stud and having a deformable end wall intermediate the end faces thereof spaced from said ball end of the stud.

7. In a rubber bushed ball and socket joint including a ball stud and a housing, the improvement of a resilient bushing in said housing receiving the ball end of the stud and having a deformable end wall spaced from said ball end and said housing capable of deforming when the bushing is subjected to radial load to prevent translation of said radial load into axial load on the stud.

8. A ball and socket joint comprising a ball stud having a shank portion and a hollow ball end with a bore therethrough connecting the hollow interior thereof with the outside of the ball end, a housing member receiving said ball end of the stud, and a pair of rubber rings having liners therein defining a ball socket for the ball end of said stud, one of said rings having an end wall spaced from the housing and the ball end of the stud to seal said socket whereby lubricant from the hollow interior of the ball end of the stud can flow through said opening and be retained in said socket chamber by said end wall while said end wall is capable of deforming in either direction without axially loading the stud.

MATTHEW P. GRAHAM.
ANTHONY VENDITTY.